United States Patent [19]

Collette et al.

[11] 4,298,722

[45] Nov. 3, 1981

[54] FRACTIONABLE, ELASTOMERIC POLY (1-BUTENE)

[75] Inventors: John W. Collette, Wilmington, Del.; Charles W. Tullock, Landenberg, Pa.

[73] Assignee: E. I. Du Pont de Nemours and Company, Wilmington, Del.

[21] Appl. No.: 129,476

[22] PCT Filed: Jan. 10, 1980

[86] PCT No.: PCT/US80/00014

§ 371 Date: Mar. 11, 1980

§ 102(e) Date: Mar. 11, 1980

[51] Int. Cl.$^3$ .................. C08F 10/08; C08F 10/14
[52] U.S. Cl. ................... 526/348.6; 260/33.2 R; 260/33.6 A; 525/191; 525/240; 526/96; 526/113; 526/118; 526/130; 526/154; 526/348.2

[58] Field of Search .................. 526/348.6, 348.2

[56] References Cited

U.S. PATENT DOCUMENTS

| | | | |
|---|---|---|---|
| 3,175,999 | 3/1965 | Natta et al. | 260/93.7 |
| 3,197,452 | 7/1965 | Natta et al. | 260/93.7 |
| 3,894,120 | 7/1975 | Frese et al. | 526/348.6 |
| 3,932,307 | 1/1976 | Setterquist | 252/430 |
| 3,950,269 | 4/1976 | Setterquist | 252/430 |

FOREIGN PATENT DOCUMENTS

564233 6/1957 Italy .
855753 12/1960 United Kingdom .
856737 12/1960 United Kingdom .

*Primary Examiner*—Stanford M. Levin
*Attorney, Agent, or Firm*—James A. Costello

[57] ABSTRACT

A fractionable, elastomeric polymer of 1-butene consisting essentially of 30% to 80%, by weight, of an ether-soluble fraction having an intrinsic viscosity exceeding 1.5 and an infrared crystallinity value of about 1% to 15%; and 20% to 70%, by weight, of an ether-insoluble fraction having an infrared crystallinity value of about 20% to 55%; said polymer having an nmr isotacticity of about 20% to 50% and an intrinsic viscosity exceeding 1.5; elastomeric copolymers of 1-butene; polymer blends containing said elastomeric polymers; and a catalytic process for making said elastomeric polymers.

8 Claims, No Drawings

FRACTIONABLE, ELASTOMERIC POLY (1-BUTENE)

CROSS-REFERENCE TO RELATED APPLICATION

This application corresponds to International Application No. PCT/US80/00014, filed on Jan. 10, 1980.

BACKGROUND OF THE INVENTION

1. Field of the Invention

Elastomeric poly(1-butene), copolymers of 1-butene, and polymer blends containing said polymers and copolymers, and a catalytic process for making said poly(1-butene).

2. Description of the Prior Art

Relatively noncrystalline, low-molecular-weight poly(1-butenes) are known which resemble greases or viscous oils and are consequently of little commercial interest. These amorphous polymers have properties which lie between those of a viscous liquid and an unvulcanized noncrystallizable elastomer (U.S. Pat. No. 3,197,452, column 2).

High-molecular weight, highly crystalline poly(1-butenes) are also known. Although such highly crystalline polymers usually have a relatively noncrystalline fraction, the fractionable polymer will behave substantially like the high-crystalline fraction. This is so regardless of any elastomeric attributes which the noncrystalline fraction may display when separated from the rest of the polymer. See, for instance, U.S. Pat. No. 3,175,999, U.S. Pat. No. 3,197,452, British Pat. No. 855,753, British Pat. No. 856,737 and Italian Pat. No. 564,233.

Thus, there is a need for a poly(1-butene) which is elastomeric despite having relatively high- and low-crystalline fractions. there is a need especially for such poly(1-butene) which is elastomeric as made, without the need for subsequent separation and recovery of an elastomeric fraction. Such needs are now met by the fractionable, elastomeric, whole-polymer poly(1-butene) of this invention.

SUMMARY OF THE INVENTION

This invention concerns fractionable, elastomeric poly(1-butene), copolymers of 1-butene, blends containing poly(1-butene), and a process therefor. The fractionable, elastomeric polymer of 1-butene consists essentially of (i) 30% to 80%, by weight, of an ether-soluble fraction having an intrinsic viscosity exceeding 1.5 and an infrared crystallinity value of about 1% to 15%; and (ii) 20% to 70%, by weight, of an ether-insoluble fraction having an infrared crystallinity value of about 20% to 55%;

said polymer further characterized by (a) intrinsic viscosity exceeding 1.5,
(b) nmr isotacticity of 20% to 50%,
(c) tensile set not exceeding 150%, and
(d) tensile stress, $M_{100}$, above 10.

The poly(1-butene) of this invention has an overall ir crystalline content between about 15% to 40%.

The process for making the polymer of this invention comprises polymerizing 1-butene in the presence of a catalyst which is the reaction product of an organometallic compound with the partially hydrated surface of a metal oxide such as $Al_2O_3$, $TiO_2$, $SiO_2$ or physical mixtures thereof. The organometallic compounds are those of the formula $(RCH_2)_4M$, where M is Ti, Zr or Hf; R is aryl, aralkyl, tertiary alkyl, e.g., trialkylmethyl, or trialkylsilyl, and the $RCH_2$ group has no hydrogen bonded to the atom in the beta-position to M; or of the formula $Ar_2Ti$, where Ar is benzene optionally substituted with up to three methyl groups. The aforementioned alkyl groups can contain from 1 to 12 carbon atoms.

Typically, the two catalyst components are reacted in the ratio of about 0.01 to 0.30 millimole of the organometallic compound per gram of metal oxide. Although slightly higher ratios than 0.30 may be employed, it is known that a ratio of 0.4 is too high. Consequently, it is preferred to operate with about 0.30 as the upper parameter of the ratio of organometallic compound per gram of metal oxide.

The catalyst is employed in the amount of 1 gram-atom of zirconium, hafnium or titanium per 40,000 to 2,500,000 grams of 1-butene. Representative organometallic compounds include tetraneophylzirconium, tetraneopentylzirconium, tetrabenzyltitanium, tetrabenzylzirconium, tetraneopentylhafnium, tetrabenzylhafnium, tetrakis(trimethylsilylmethyl)zirconium, tetraneophyltitanium, tetraneopentyltitanium, bis(benzene)titanium, bis(toluene)titanium, and bis(mesitylene)titanium.

The elastomeric poly(1-butene) of this invention can be blended in all proportions with polyolefins such as polyethylene, polypropylene, poly(1-butene) and ethylene-alpha-olefin copolymers. The properties vary widely depending on the components and ratios of components of the blend. For example, amounts of about 80% or more of the elastomeric poly(1-butene) may be needed to insure elastomeric blends with highly isotactic polypropylenes and polybutenes. Lesser concentrations of the elastomeric poly(1-butene) have been found to aid impact resistance and to provide tougher and/or softer blends depending on the desired end result and the nature and concentration of the individual polymers combined with it.

The compositions of this invention also include copolymers comprising at least 90 mole percent of units derived from (1-butene) and up to about 10 mole percent of units derived from alpha-olefins other than 1-butene. Such alpha-olefins can be incorporated into the polymers by copolymerization without changing the essential properties described herein. Representative of such alpha-olefins are ethylene, propylene, 1-pentene, 1-hexene and copolymers thereof.

DETAILS OF THE INVENTION

Definitions

By "fractionable" is meant that the elastomeric poly(1-butene) of this invention is composed of two fractions, one of which is ether-soluble and one of which is ether-insoluble. The tests for ether solubility/insolubility were run in diethyl ether according to the following general procedure. The ether is heated to boiling in a round bottom glass flask. The vapors rise through the outer zone of a vertical cylindrical chamber and are cooled in a reflux condenser. The condensate drips into a fiber thimble or a glass thimble with a fritted glass filter disk in its bottom, such thimble being suspended in the center of the vertical cylinder. The thimble contains a sample (1-2 g) of the poly(1-butene), of average particle size no greater than about ⅛ inch (3 mm). The outer wall of the thimble is surrounded by and heated by the hot solvent vapor, so that the actual extraction is conducted at or near the boiling temperature of the solvent. Extraction is continued until there is no more than an 0.01 g loss in a 15 hr extraction period. The entire operation is carried out in an atmosphere of nitrogen and solvent vapor. The proportion of the sample extracted and the proportion which is not extracted are those proportions (fractions) referred to herein respectively as "ether-soluble" and "ether-insoluble."

The fraction soluble in ether will generally decrease if the samples are milled or otherwise hot-processed prior to the analysis. This decrease is believed to be due to the interaction of the ether-soluble fraction with the more-crystalline component in the product and is important for the development of the elastic properties.

The term "tensile set" which is also employed to define the elastomeric nature of these polymers refers to the elongation remaining in a compression-molded specimen after it has been stretched at a rate of 20 inches (51 cm) per minute to 300% elongation at 22° to 24° C. and then immediately allowed to recover at the same rate until the specimen is at zero stress. It is expressed as a percentage of the original length or distance between bench marks. Preferably, the whole polymers have tensile sets not exceeding 100%. "Tensile stress," "$M_{100}$," is the stress required to stretch molded objects to an elongation of 100% at the rate of 20 inches (51 cm) per minute at 25° C.

By "whole polymer" is meant the direct reaction product without separation of any poly(1-butene) component or fraction. The elastomeric whole polymer of this invention is produced by the process of this invention without sequential polymerization in which reaction conditions or proportions of monomers are varied during polymerization.

By "isotacticity" is meant the proportion of polymerized 1-butene units that occur in chain segments in which five successive polymerized 1-butene units have an identical steric configuration. Thus, a poly(1-butene) in which 45% of the polymerized 1-butene units are contained in segments of five or more successive polymerized 1-butene units, each such unit having the same steric configuration, has an isotactic content of 45%. Isotactic content can be measured by $^{13}C$ nuclear magnetic resonance (nmr) according to the following procedure.

The $^{13}C$ nmr spectra are obtained at 137° C. with a Bruker WH-90 nmr spectrometer operating for 22.63 MHz in the Fourier transform mode. For typical runs, 10,000 scans are taken. The radio frequency pulse is adjusted to give a 60° tilt angle. Samples are run as solutions of 0.2 g polymer in a mixture of 1 ml of o-dichlorobenzene and 1 ml of dideuterotetrachloroethane containing 0.05% weight-volume BHT (2,6-di-t-butyl-4-methylphenol) as stabilizer and tetramethylsilane as reference. The $^{13}C$ nmr isotactic content is the area of the mmmm pentad peak of the side chain methylene carbon atom at about 21.0 ppm divided by the whole area of the $^{13}C$ methyl resonances; see Zambelli et al; Macromolecules, 6, 925 (1973), for the corresponding analysis of isotactic polypropylene.

The degree of "crystallinity" is estimated from the infrared absorption spectrum using the absorption at 1121 cm$^{-1}$ and 1151 cm$^{-1}$ in the equation:

$$\text{Crystallinity} = \frac{[(A1121/A1151)_{solid} - 0.76]}{5.43 - 0.76}$$

derived by Nishioka and Yanagisawa, Chem. of High Polymers (Japan) 19, 667 (1962).

"Intrinsic viscosity" as referred to herein is determined as follows. At 25° C., 0.0275 g of the poly(1-butene) sample is placed in 50 ml of decahydronaphthalene containing 1.0 g/l BHT to give a weight-volume concentration of 0.05% at 135° C., at which temperature the sample is dissolved under nitrogen as it is stirred with a magnetic stirrer for two hours. The solution is poured through a filter stick into a Cannon-Ubbelohde viscometer in which its efflux time is measured at 135° C. in comparison with that of the solvent alone.

Intrinsic viscosity $$[\eta] = \frac{\sqrt{2}}{c} \sqrt{\eta_{sp} - \ln rel}$$

c = concentration (0.05 g per deciliter)

$$\eta_{sp} = \frac{t - t_o}{t_o}$$

$$rel = \frac{t}{t_o}$$

t = efflux time of the solution
$t_o$ = efflux time of the solvent
See O. F. Solomon and I. Z. Ciuta, J. of Appl. Polymer Science, 6, 683 to 86 (1962). The relationship between "intrinsic viscosity" as defined and molecular weight of the elastomeric poly(1-butene) is as follows.
$[\eta] = KM^a$
$K = 9.49 \times 10^{-5}$;
$a = 0.73$
M = viscosity molecular weight.
The values for the constants in this Mark-Houwink-Sakarada equation are given for poly(1-butene) in "Polymer Handbook" by Brandrup and Immergut, Interscience Publishers, New York, 1967, Table IV-2, −7.

PREFERRED EMBODIMENTS

Preferably, the poly(1-butene) of this invention has an ether-soluble fraction of 40% to 75%; a tensile set not exceeding 100%; an intrinsic viscosity above 2; and an isotactic content of about 30% to 40%. The polymers of this invention have tensile strengths of about 600 psi to 2100 psi (42 kg/cm$^2$ to 147 kg/cm$^2$).

Preferred catalysts for making the poly(1-butene) of this invention are those resulting from the reaction of organozirconium compounds $(RCH_2)_4Zr$, especially tetraneophylzirconium (TNZ), with hydroxylated alumina $(Al_2O_3)$ in the ratio of about 0.01 to 0.30 millimole of organozirconium compound per gram of alumina. Such catalysts and their preparation are described in U.S. Pat. No. 3,932,307. Preferably, the hydroxylated alumina is prepared by allowing fumed alumina to equilibrate with and thereby adsorb atmospheric moisture followed by heating at about 120° to 500° C. for up to about 10 hrs in a stream of nitrogen. Also included among the suitable catalysts are those prepared by hydrogenating the aforementioned reaction products of the organometallic compound and metal oxide according to the process described in U.S. Pat. No. 3,950,269.

In the polymerization process, the catalyst, normally in the form of a suspension in a hydrocarbon such as cyclohexane (about 25 to 50 milliliters of hydrocarbon per gram of metal oxide), is brought into contact with liquid 1-butene or with 1-butene dissolved in a suitable solvent such as hexane or cyclohexane. Alternatively, the catalyst can be prepared in situ by bringing its components together in the presence of the monomer or monomers. Preferably, the reaction medium is liquid 1-butene; and the reaction involves formation of a slurry of poly(1-butene) in the liquid monomer.

The reaction can be carried out at atmospheric pressure or at elevated pressure up to about 5000 psi (350 kg/cm$^2$). Both batch and continuous polymerization can be employed. The usual batch reaction time is about 10 minutes to two hours. Reaction temperatures range from about 0° to 175° C., preferably 25° C. to 100° C. The poly(1-butenes) of this invention can be prepared in the presence of hydrogen gas which, it has been found, reduces the intrinsic viscosities of the polymers.

After the catalytic reaction process has been completed and excess 1-butene vented, the poly(1-butene) can be isolated by conventional methods. When the reaction medium is liquid 1-butene, hot-milling, extraction-extrusion, or steam-stripping can be used to remove any remaining unreacted 1-butene and any volatile solvent that was part of the catalyst slurry. Alternatively, the product mixture can be swollen to a gel by addition of a liquid hydrocarbon such as cyclohexane and the poly(1-butene) can be precipitated and converted to a filterable solid by addition of a liquid such as acetone, following which it can be isolated by filtration. When the reaction medium is a liquid such as cyclohexane, the poly(1-butene) can be isolated by precipitation with acetone followed by filtration as just described.

The whole polymers of this invention can be blended with highly isotactic poly(1-butene) over wide proportions, e.g., 2 to 98 weight percent, to produce blends having useful properties. Blends containing about 80 to 95% by weight of the poly(1-butene) of this invention and 5% to 20% by weight of highly isotactic poly(1-butene) generally have elastomeric properties. Blends containing lower ratios of the poly(1-butene) of this invention may not be elastomeric but will display improved impact resistance versus the isotactic poly(1-butene). The highly isotactic poly(1-butene) used will generally have an isotactic content above about 85%.

The poly(1-butenes) of this invention can be processed in the same manner as conventional elastomers. If desired, the product can be compounded with additives such as carbon black, mineral fillers, oil and pigments. The poly(1-butene) is an excellent general-purpose thermoplastic elastomer having properties which make it suitable for use in films (including heat-shrinkable films), filaments, fibers, and sheets that have elastomeric properties and for fabric coating applications, wire and cable coatings, hot melt adhesives and injection-molded, compression-molded, or extruded articles such as tubing.

The polymer of this invention does not require the addition of extractible plasticizers for high flexibility and so is especially useful for extruded flexible tubing which comes in contact with such liquids as milk, blood and parenteral fluids. Such tubing can be made by known techniques such as melt extrusion at temperatures of about 200° C. to 250° C. in an extruder containing a polyethylene screw and a tubing die-and-pin arrangement. The tubing is extruded into a vacuum box filled with water to quench the product and maintain its dimensions. Whole polymer or elastomeric blends of whole polymer with highly isotactic poly(1-butene) are contemplated for this end use.

Polymer of this invention can be subjected to thermal and mechanical treatment such as shear for use in products requiring lower molecular weights and narrower weight distributions. An important advantage of this invention is that it provides a fractionable, elastomeric poly(1-butene) which does not need to be separated into its fractions in order to be useful as an elastomer.

Although not wishing to be bound by this hypothesis, it is believed that the following factors characterize the elastomeric poly(1-butene) of this invention. The ether-soluble fraction is most important in contributing to the elastomeric properties of the polymers. This fraction is highly elastomeric but is generally of low tensile strength. This ether-soluble fraction, however, interacts with the more crystalline fraction to result in a fractionable polymer having both elastomeric properties and high tensile strength. It is believed, in this regard, that the isotactic units in the more crystalline fraction co-crystallize with the isotactic units in the less crystalline, ether-soluble fraction to provide an elastomeric polymer network having the desirable properties described herein.

The primary difference between the elastomeric poly(1-butene) of this invention and the nonelastomeric poly(1-butenes) of the art is that the polymer of this invention has characteristic properties representing a balance of elasticity from the ether-soluble fraction and strength from the ether-insoluble fraction. On the contrary, fractionable poly(1-butenes) of the art do not give a balance of properties because invariably the elasticity of the more elastic fraction(s) is masked by the rigidity of the more crystalline fraction(s).

The following Examples illustrate the invention. Care was taken to exclude oxygen and water from all polymerizations and from all steps preceding them. All materials used were of high purity. Catalyst slurries were made up under nitrogen, and all transfers were carried out under nitrogen. Except as noted, alumina catalyst supports were prepared by allowing fumed alumina to equilibrate with atmospheric moisture followed by heating the resulting product for four hours at 400° C. in a stream of nitrogen and cooling under nitrogen.

All tensile and stress-strain measurements referred to herein are carried out on straight or dumbbell specimens 0.25 inch (0.64 cm) wide and 0.018 to 0.080 inch (0.045 to 0.20 cm) thick by ASTM method D412.

EXAMPLE 1

A 1-liter stainless-steel autoclave equipped with a stirrer was loaded with about 500 ml of cyclohexane and heated at 150° C. for 15 minutes. It was cooled to 35° C. and the cyclohexane was removed. The autoclave was then purged with nitrogen at 150° C. for 1 hour, pressured with nitrogen to 150 psi (10.5 kg/cm$^2$), and allowed to cool to room temperature.

A slurry of catalyst was prepared by stirring 1 gram of alumina (Al$_2$O$_3$) in 40 ml of cyclohexane overnight, adding a solution of 0.3 mmol of tetraneophyl-zirconium in 1.5 ml of toluene, and stirring for 1 hour more.

Cyclohexane (500 ml) was passed through a bed of Woelm acid alumina into a glass container. To this was added the catalyst slurry described above, and the system was pressured with nitrogen into the autoclave. The autoclave was closed, and 100 grams of 1-butene was added. As the system was stirred at 500 rpm, the temperature was raised and held at 60° to 64° C. for 19 hours. The gel obtained was precipitated by mixing it with acetone in a blender and separated by filtration. It was stabilized by stirring with an 0.05% solution of Ionox ® 330 antioxidant in 400 ml of methanol, filtering, and drying. Ionox ® 330 is the tradename for 1,3,5-trimethyl-2,4,6-tris(3,5-di-t-butyl-4-hydroxybenzyl)benzene. The poly(1-butene) thus obtained, after being air-dried and then dried at 70° C./0.2 mm, weighed 32.7 grams. A flexible, tough, elastic film of the polymer was prepared by hot-compression molding at 180° C. Pertinent properties of the polymer made by the procedure of Example 1 are set out in Table 3 along with those of the polymers made according to the procedures of Examples 2 to 11.

EXAMPLE 2

A 1-liter stainless-steel autoclave equipped with a stirrer was loaded with about 500 ml of cyclohexane and heated at 150° C. for 15 minutes. It was then cooled and the cyclohexane was removed. The autoclave was purged with nitrogen at 150° C. for 1 hour, pressured with nitrogen to 100 psi (7.0 kg/cm$^2$), and allowed to cool to room temperature.

A slurry of catalyst was prepared by stirring 3 grams of alumina in 70 ml of cyclohexane overnight, adding a solution of 0.45 mmol of tetraneophylzirconium in 2.25 ml of toluene, and stirring for 1 hour more.

The catalyst slurry was added from a hypodermic syringe to the autoclave at ambient temperature and pressure. The autoclave was evacuated and pressured with hydrogen to 25 psi (1.8 kg/cm$^2$). The system was stirred at 500 rpm, and 200 grams of 1-butene was added. The polymerization mixture was heated to 52° C. over 0.3 hour and then at 52° to 40° C. for 2.7 hours. The product, a white, opaque, tough, rubbery mass, was precipitated with acetone as in Example 1 and stabilized by being slurried with 700 ml of an 0.05 solution of Ionox ® 330 in methanol, followed by filtration and drying at 50° C./0.2 ml. There was thus obtained 191 grams of poly(1-butene). The product was homogenized by milling at 100° C. A flexible, elastic sheet of the product was prepared by hot-compression molding at 150° C. Properties are given in Table 3.

EXAMPLE 3

A 1-liter stainless-steel autoclave equipped with a stirrer was conditioned with cyclohexane and nitrogen as in Example 1, except that the nitrogen purge was continued for 5 hours.

A catalyst slurry was prepared by stirring 1 g of alumina in 40 ml of cyclohexane overnight, adding a solution of 0.05 mmol of tetraneophylzirconium in 0.25 ml of toluene, and stirring for 1 hour more.

The catalyst slurry was added from a syringe to the autoclave at ambient temperature and pressure. The autoclave was then evacuated and pressured with hydrogen to 28 psi (2.0 kg/cm$^2$). Then, 1-butene (200 g) was introduced, and as the system was stirred at 500 rpm the temperature was raised to 50° C. and held at 46° to 50° C. for 2 hours. The gel obtained was cut into small pieces and dried at 70° C./0.2 mm. There was thus obtained 124.2 g of poly(1-butene) which was stabilized by being milled at 120° C. with 0.621 g of Cyanox ® LTDP and 0.13 g of Topanol ® CA antioxidants. Cyanox ® LTDP is the tradename for dilauryl thiodipropionate; Topanol ® CA is the tradename for the condensation product of 3 moles of 3-methyl-6-t-butylphenol with 1 mole of crotonaldehyde. Sheets of the product were prepared by milling and molding at 150° C. Properties are given in Table 3.

EXAMPLE 4

A 1-liter stainless-steel autoclave equipped with a stirrer was loaded with about 500 ml of cyclohexane and heated at 150° C. for 25 minutes. It was cooled to room temperature and the cyclohexane was removed. The autoclave was then purged with nitrogen at 150° C. for 5 hours, pressured with nitrogen at 200 psi (14.0 kg/cm$^2$), and allowed to cool to room temperature.

A slurry of 2 g of alumina in 80 ml of cyclohexane was charged to the autoclave from a syringe, the system was pressured with hydrogen to 10 psi (0.7 kg/cm$^2$), the autoclave was cooled to 0° C., and 200 g of 1-butene was charged. As the system was stirred at 100 rpm, it was heated to 50° C., at which temperature a solution of 0.3 mmol of tetraneophylzirconium in 3 ml of toluene was injected under nitrogen pressure. The temperature of the reaction mixture immediately rose to 60° C., cooling water was applied, and the temperature rose to 75° C. in 5 minutes and dropped over the next 12 minutes to 74° C.

Volatile materials were then vented at atmospheric pressure and 5 ml of methanol was added to stop the polymerization. The solid poly(1-butene) thus obtained was cut up and dried at 70° C./0.2 mm. It weighed 36.0 g and 46% was soluble in diethyl ether. The product was stabilized by milling with 0.175 g of Cyanox ® LTDP and 0.087 g of Topanol ® CA at 150° C. A smooth, tough, elastic sheet was then prepared by compression molding at 150° C. Properties are given in Table 3.

COMPARISON A

When the foregoing Example was repeated but with 0.4 mmol of tetraneophylzirconium instead of 0.3 mmol, the poly(1-butene) obtained had a tensile set of over 150%. In contrast, elastomeric polypropylene with a tensile set of less than 150% can be made from propylene by this method with tetraneophylzirconium-/alumina ratios of 0.4 mmol/g or even higher as described in assignee's German OLS No. 2,830,160.

COMPARISON B

As a toughening agent and a plasticizer to make isotactic poly(1-butene) softer, elastomeric poly(1-butene) of this invention is unexpectedly more effective when the elastomeric polypropylene of German OLS 2,830,160. Thus, a commercial isotactic poly(1-butene) containing 25% carbon black, made by Polyform, Inc., was blended with 10%, 30%, and 50% of the elastomeric poly(1-butene) (ELPB) of Example 6 and with 10%, 30%, and 50% of the elastomeric polypropylene (ELPP) of the German OLS. As shown in Table 1, objects molded from blends containing ELPB consistently had higher tensile strengths at break and higher elongations at break than objects molded from blends containing ELPP. The ELPB can also provide lower use temperatures than ELPP; at 30% elastomer the above blend with ELPB has a glass transition temperature of −26° C. whereas the corresponding blend with ELPP has a glass transition temperature of −9° C.

TABLE 1

|  | 0% Elastomer | 10% Elastomer | | 30% Elastomer | | 50% Elastomer | |
|---|---|---|---|---|---|---|---|
|  |  | EL-PB | EL-PP | ELPB | ELPP | ELPB | ELPP |
| Tensile Strength (kg/cm²) | 227 | 255 | 146 | 210 | 167 | 167 | 125 |
| Elongation (%) | 250 | 358 | 256 | 500 | 352 | 657 | 516 |

EXAMPLES 5 TO 11

Additional preparations of elastomeric poly(1-butene) were carried out by essentially the method of Example 2. These Examples, 5 to 9, are summarized in Table 2. Examples 10 and 11 were run by the general procedure of Example 4.

The elastic poly(1-butene) of Example 6 when blended 30/70 with a commercial isotactic poly(1-butene) made by Polyform, Inc. and containing 25% of carbon black filler had a notched Izod impact strength of 11.6 ft lb/in compared with 2.6 ft lb/in for the commercial poly(1-butene) alone.

Hydrogen was used only in Example 8, in the amount of 1.8 kg/cm².

TABLE 2

| Example | Organometallic Reactant (OMR) | Mmol OMR/g Al₂O₃ | Gms Product |
|---|---|---|---|
| 5 | Bis(mesitylene)-titanium | 0.2/2 | 15.0 |
| 6 | Tetrabenzyl titanium | 0.3/3 | 100.5 |
| 7 | Tetraneophyl-titanium | 0.3/3 | 82.0 |
| 8 | Tetrabenzyl-zirconium | 0.2/2 | 121.0 |

TABLE 2-continued

| Example | Organometallic Reactant (OMR) | Mmol OMR/g Al₂O₃ | Gms Product |
|---|---|---|---|
| 9 | Tetraneophylhafnium | 0.2/2 | 50.0 |
| 10 | Tetraneophyl-zirconium | 0.2/2 | 109.0 |
| 11 | Tetraneophyl-zirconium | 0.3/1.5 | 73.0 |

TABLE 3

| Polymer of Example | (a)[1] Ether-Soluble Fraction (%) | (b)[1] Intrinsic Viscosity of (a) | (c)[1] IR Crystallinity of (a) (%) | (d)[1] IR Crystallinity of Ether-Insoluble Fraction (%) | (e)[1] Intrinsic Viscosity of Whole Polymer | (f) Isotacticity of Whole Polymer (%) | (g) Tensile Set of Whole Polymer (%) | (h) Tensile Stress of Whole Polymer ($M_{100}$) (Kg/cm²) | (i) Tensile Strength At Break (Kg/cm²) | (j) Elongation At Break (%) |
|---|---|---|---|---|---|---|---|---|---|---|
|  |  |  |  |  |  |  | All Values Determined on Milled Samples | | | |
| 1 | 65 | 6.42 | — | 45 | 6.30 | 46 | 140 | 42.7 | 110.0 | 380 |
|  | 12M | 0.62M |  | — | 6.26M |  |  |  |  |  |
| 2 |  |  | 7 |  | 3.61 | 32 | 98 | 16.3 | 74.7 | 740 |
|  | 42M | 1.28M |  | 24M | 2.80M |  |  |  |  |  |
| 3 |  |  | 7 |  |  | 37 | 93 | 13.3 | 46.9 | 720 |
|  | 66M | 0.95M |  |  | 2.25M |  |  |  |  |  |
| 4 | 46 | 3.35 | 10 | 29 |  | 26 | 75 | 14.0 | 87.8 | 690 |
|  | 21M | 1.71M | 12M | 24M | 5.81M |  |  |  |  |  |
| 5 | — | — | — | — | 19.90 | 23 | 147 | 40.0 | 136.6 | 485 |
|  |  |  |  |  | 3.76M |  |  |  |  |  |
| 6 | — | — | — | — | 11.36 | 36 | 103 | 33.2 | 82.0 | 330 |
|  |  |  |  |  | 6.89M |  |  |  |  |  |
| 7 | — | — | — | — | 11.98 | 42 | 119 | 28.9 | 96.2 | 415 |
|  |  |  |  |  | 6.28M |  |  |  |  |  |
| 8 | — | — | — | — | 4.07 | 40 | 121 | 42.0 | 92.8 | 510 |
|  |  |  |  |  | 3.20M |  |  |  |  |  |
| 9 | — | — | — | — | 18.75 | 44 | 93 | 34.5 | 105.0 | 370 |
|  |  |  |  |  | 8.73M |  |  |  |  |  |
| 10 | 38 | 1.85 | 7 | 25 | 7.12 | 45 | 69 | 12.6 | 74.2 | 720 |
|  |  |  |  |  | 5.16M |  |  |  |  |  |
| 11 | 51 |  |  |  | 5.87 | 44 | 106 | 24.0 | 106.2 | 640 |
|  | 41M | 3.37 | 11 | 33 | 3.35M |  |  |  |  |  |

[1]-Numerical values followed by "M" were obtained on milled samples. Values which are not followed by "M" were determined on the sample before milling.

The embodiments of the invention in which an exclusive property or privilege is claimed are defined as follows:

1. A fractionable, elastomeric, whole-polymer poly(1-butene) consisting essentially of
   (i) 30% to 80%, by weight, of an ether-soluble fraction having an intrinsic viscosity exceeding 1.5 and an infrared crystallinity value of about 1% to 15%; and
   (ii) 20% to 70%, by weight, of an ether-insoluble fraction having an infrared crystallinity value of about 20% to 55%;
said polymer further characterized by
   (a) intrinsic viscosity exceeding 1.5,
   (b) nmr isotacticity of 20% to 50%,
   (c) tensile set not exceeding 150%, and
   (d) tensile stress, $M_{100}$, above 10.

2. A poly(1-butene) according to claim 1, wherein the ether-soluble fraction is 40% to 70%.

3. A poly(1-butene) according to claim 1, wherein the intrinsic viscosity is above 2.

4. A poly(1-butene) according to claim 1, wherein the tensile set does not exceed 100%.

5. A poly(1-butene) according to claim 1, wherein the overall crystalline content is between 15% to 40% and the isotactic content is between 35% to 40%.

6. A fractionable copolymer comprising at least about 90 mole percent of units derived from 1-butene and up to about 10 mole percent of units derived from at least one alpha-olefin selected from the group ethylene, propylene, 1-pentene, and 1-hexene, said copolymer consisting essentially of 30% to 80%, by weight, of an ether-soluble fraction having an intrinsic viscosity exceeding 1.5, the balance being an ether-insoluble fraction, said polymer further characterized by an intrinsic viscosity exceeding 1.5, and a tensile set not exceeding 150%.

7. A copolymer according to claim 6 wherein the alpha-olefin is propylene.

8. A copolymer according to claim 6 wherein the alpha-olefin is ethylene.

* * * * *